March 24, 1953  F. G. SCHWEISTHAL  2,632,465
REVERSING VALVE FOR CENTRALIZED LUBRICATING SYSTEMS
Filed Dec. 12, 1946  2 SHEETS—SHEET 1
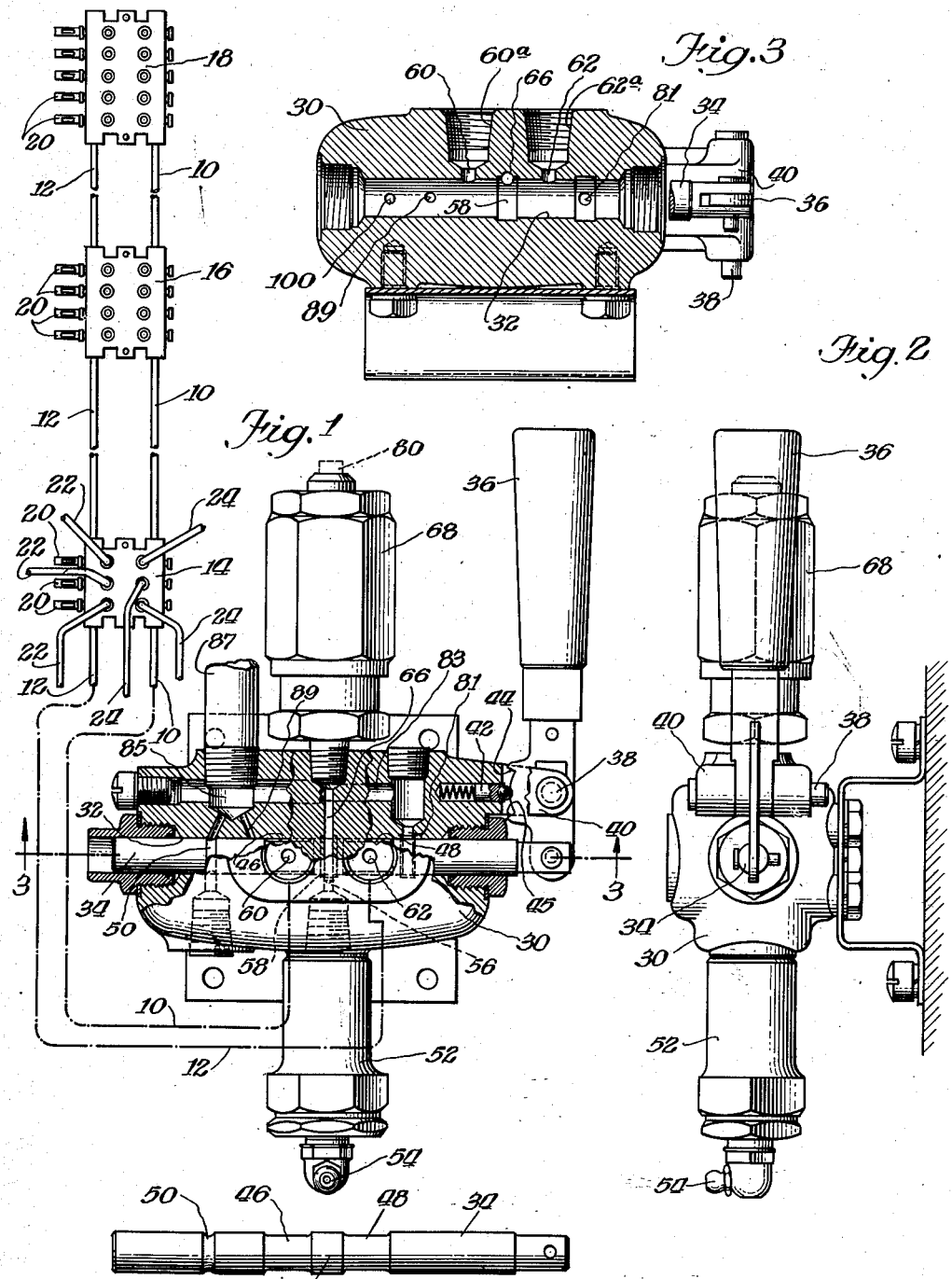
Inventor:
By: Frederick G. Schweisthal
Hinkle, Horton, Ahlberg, Hansmann & Kupper
Attorneys.

March 24, 1953 F. G. SCHWEISTHAL 2,632,465
REVERSING VALVE FOR CENTRALIZED LUBRICATING SYSTEMS
Filed Dec. 12, 1946 2 SHEETS—SHEET 2

Inventor:
Frederick G. Schweisthal
Hinkle, Horton, Ahlberg, Hansmann & Wupper
Attorneys.

Patented Mar. 24, 1953

2,632,465

UNITED STATES PATENT OFFICE 2,632,465

REVERSING VALVE FOR CENTRALIZED LUBRICATING SYSTEMS

Frederick G. Schweisthal, Skokie, Ill., assignor to Stewart-Warner Corporation, Chicago, Ill., a corporation of Virginia Application December 12, 1946, Serial No. 715,697

4 Claims. (Cl. 137—557)

1

This invention relates to a manually operable reversing valve adapted for use with various types of centralized lubricating systems in which the lubricant is first directed into one feed line for actuating a plurality of lubricant measuring valves and then, to complete the cycle, is directed through another feed line or else is fed in the opposite direction through the entire system for further actuation of the measuring valves.

One object of the invention is to provide a new and improved reversing valve of relatively simple construction adapted to be employed with various types of lubricating systems.

Another object of the invention is to provide a reversing valve adapted for use with various lubricating systems and having provision for the installation of a pressure responsive indicator which is differently employed in different systems.

It is also an object of the invention to provide an improved reversing valve for use with centralized lubricating systems having a single movable valve member arranged to afford all the necessary connections for the several portions of the cycle of each system when manually adjusted to control the cycle.

A further object of the invention is to provide a reversing valve for a centralized lubricating system having a single movable valve member and being otherwise relatively simple and inexpensive to construct.

Other objects and advantages of the invention will appear from the following description taken in connection with the drawings, in which:

Fig. 1 is a side elevational view of a reversing valve shown partially in section and including a diagrammatic representation of a lubricating system connected to the valve;

Fig. 2 is an end elevation of the valve shown in Fig. 1;

Fig. 3 is a horizontal sectional view of the valve body with the valve member broken away to show certain ports controlled thereby, the section being taken on line 3—3 on Fig. 1;

Fig. 4 is a side elevational view of the valve member itself;

Figure 5:
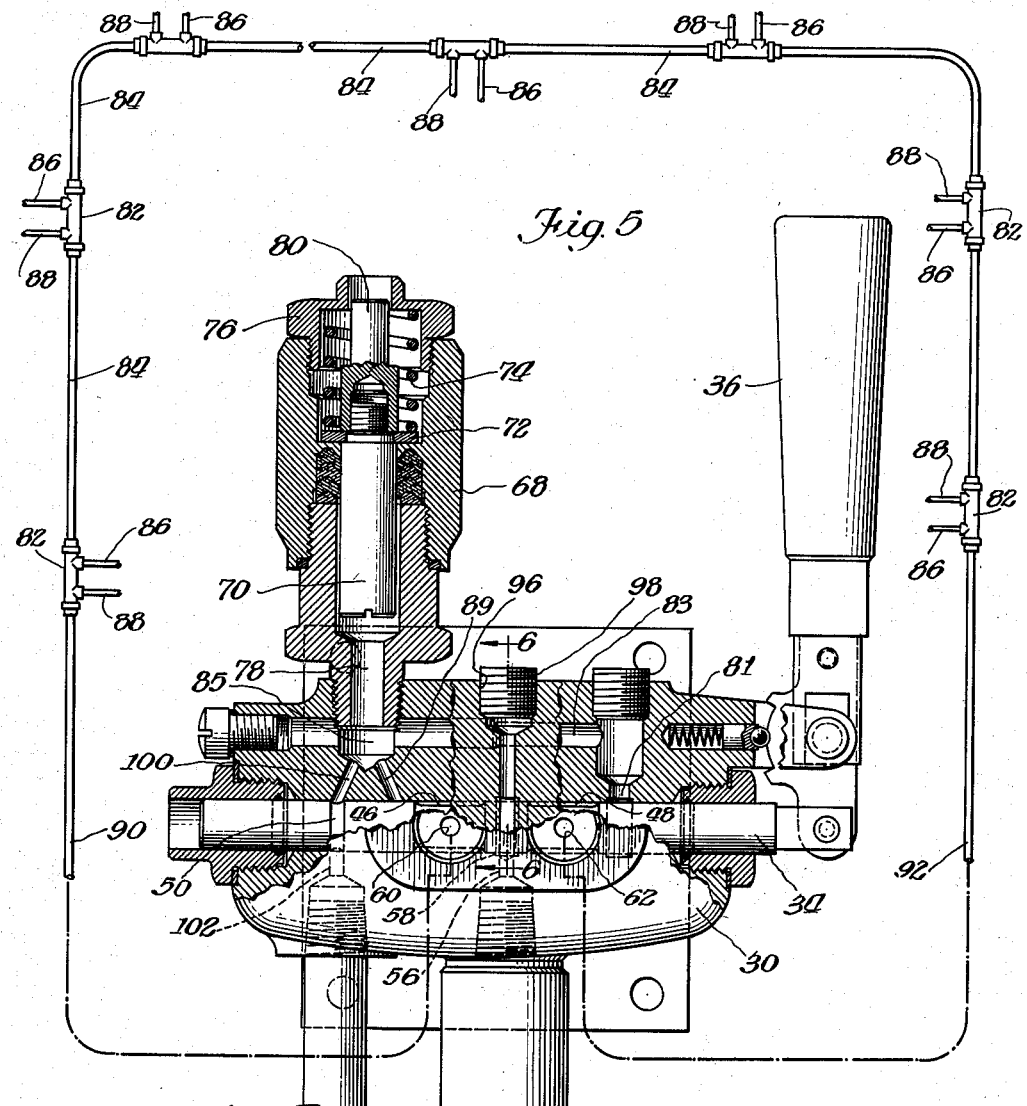
Fig. 5 is a side elevational view of the valve shown in Fig. 1 together with a diagrammatic representation of a different centralized lubricating system connected to the valve and with certain parts of the valve and the associated indicator shown in section.
Figure 6:
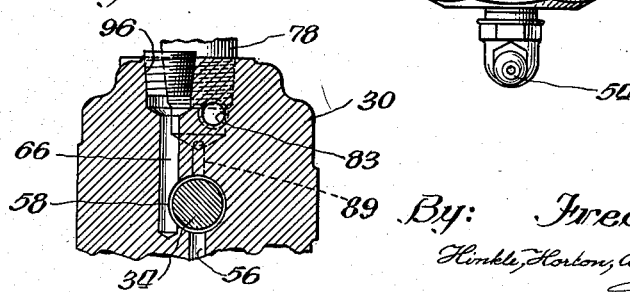
Fig. 6 is a fragmentary detail sectional view taken as indicated at line 6—6 on Fig. 5.

Among centralized automatic systems there are several systems in which a series of measuring valves or feed devices for the several bearings to be lubricated is provided with two inlets so that lubricant may be fed to the series first through one inlet and then, to complete the cycle, through the other inlet. In such systems this method of operation usually has the effect of actuating the measuring valves first for feeding their individual charges of lubricant to the several bearings and simultaneously reloading the measuring valves, then discharging their second loads to the same bearings or to additional bearings, depending upon the connections leading from said valves, and again recharging the valves for subsequent operation.

Fig. 1 illustrates a system of the so called dual manifold type which includes feed lines 10 and 12 leading to and through a series of manifolds or distributing blocks, of which three are shown at 14, 16 and 18, respectively. Each of these blocks encloses a plurality of valve mechanisms slidable transversely in the block and each of these measuring valve mechanisms includes an externally visible indicator 20 which enables the operator in charge to see whether the valve is operating properly or not. Each measuring valve of the block distributes lubricant through two delivery tubes, and in Fig. 1 the tubes leading from each of the measuring valves are designated by the numerals 22 and 24, respectively. In the operation of the system, lubricant is fed to the several manifolds 14, 16 and 18 through the feed line 10, and, as a result, the measuring valves of each of these manifold blocks discharge lubricant through their delivery tubes 22. When all the measuring valves in the system have been thus actuated, the supply to the feed line 10 is cut off and lubricant under pressure is supplied to the feed line 12 which results in delivery of lubricant by each of the measuring valves through its tubes 24. In Fig. 1 the block 14 is shown equipped with delivery tubes 22 and 24, and it may be understood that similar delivery tubes lead from the manifolds 16 and 18 and all other manifold blocks of the system, but that these tubes have been omitted from the drawing. Usually in such a system each manifold block corresponds to one machine requiring lubrication and the several tubes 22 and 24 leading from the manifold serve to lubricate the several bearings or other wearing parts of that machine.

The reversing valve embodying this invention controls the supply of lubricant to the feed line 10 and then to the feed line 12 and is actuated at intervals in accordance with the requirements of the machines which the system serves. If desired, the valve may be actuated by an automatic timing mechanism, but, as shown, it is provided with means for manual operation. As seen in Fig. 1, the valve body 30 is formed with a bore 32 in which the cylindrical valve member 34 of the spool type is slidably adjustable by means of the hand lever 36 fulcrumed at 38 between lugs 40 which extend integrally from the valve body 30. A spring detent 42 is provided to hold the lever normally at midposition in its range of movement, and stop shoulders 44 and 45 formed on the lever define the limits of its range of movement by positively engaging the detent at said limits.

As shown in Fig. 4, the valve member 34 is formed with a pair of longitudinally spaced and relatively wide grooves 46 and 48, and near one end of the member 34 there is a narrow groove or channel 50. Lubricant is admitted to the valve body 30 through a filter unit 52 provided with an inlet coupling 54 to which a pump or other source of supply may be attached, and the lubricant flows from the filter unit 52 through an inlet passage 56 which intersects the bore 32 substantially at the middle of its length. At this point the bore has a circumferential channel or enlargement 58. At opposite sides of the inlet passage 56 the body 30 is formed with outlet opening 60 and 62 which lead into enlarged threaded openings 60a and 62a into which the terminal portions of the pipes 10 and 12 are connected, as diagrammatically indicated in Fig. 1. The land portion 64 of the valve member 34, when registered with the inlet 56 and channel 58, effectively cuts off communication between the inlet 56 and either of the outlets 60 and 62; but, when the valve member 34 is shifted to the right, as viewed in Fig. 1, its groove 46 connects the inlet 56 with the outlet 60 for distributing lubricant under pressure through the feed line 10 of the system. When the valve 34 is shifted to its opposite limit, the groove 48 provides a connection between the inlet 56 and the outlet 62 for supplying the lubricant under pressure through the feed line 12 of the system.

With the valve standing initially at its middle position, as shown in Fig. 1, the lubricant under pressure entering the valve body 30 through the inlet passage 56 bypasses the land portion 64 of the valve member 34 by way of the channel 58 and flows through a passage 66 into the pressure responsive indicator 68 which is shown mounted on the valve body 30. This indicator is of the same general construction as that shown in section in Fig. 5 and includes a plunger 70 having a flange 72 with a spring 74 reacting between said flange and the cap 76 of the indicator body. The lubricant under pressure entering the chamber of the indicator through its hollow stem 78 tends to force the plunger 70 upwardly in opposition to the spring 74 so as to protrude the stem 80 through the cap 76, as shown in dotted outline in Fig. 1. When the lever 36 is actuated to shift the valve member 34 to the right so as to register the inlet passage 56 and the outlet passage 60 with the groove 46 of the valve member, the pressure applied to the indicator 68 is decreased as the lubricant is released to the feed line 10 of the system and its pressure head is transformed temporarily into velocity for filling the measuring valves as they are discharged through their delivery tubes 22. The decrease of pressure causes the indicating stem 80 to fall and to remain in its lowered position until the feed line 10 has filled up with lubricant to the end of the series of manifolds which comprise the system and all the measuring valves of the system have been replenished. The flow of lubricant in the feed line 10 will then be checked and the back pressure which results will actuate the indicator and again protrude the stem 80. This visible signal will notify the operator that half the lubricating cycle has been completed and he will then shift the lever 36 to its opposite limit of movement, causing the groove 48 of the valve member 34 to connect the inlet 56 with the outlet 62, thus supplying lubricant to the feed line 12 and to all the measuring valves of the system. As the measuring valves are actuated, they will deliver their charges of lubricant by way of the delivery tubes 24 and each measuring valve will be refilled with a new charge in preparation for a later lubricating cycle. As the lubricant begins to flow into the line 12 the pressure head in the valve body 30 will be again reduced, causing the indicating stem 80 to be retracted within the body of the indicator. Then, as soon as the feed line 12 has been filled with lubricant through its length and all the valves of the system have been actuated and replenished, the back pressure in the line will build up sufficiently again to protrude the stem 80 of the indicator, advising the operator that the cycle is completed and he will then actuate the lever 36 to return the valve member 34 to its middle position, cutting off the inlet passage 56 from both outlets 60 and 62.

In the dual manifold system, because of certain features of construction of the measuring valves, the actuation of each valve by the application of pressure in one feed line, as for example feed line 10, causes a small quantity of lubricant to be expelled from the other end of the valve and into the feed line 12. It is, therefore, desirable that whenever the pressure is applied to one feed line, the other feed line shall be vented to atmosphere or to a region of low pressure such as the supply tank or reservoir of the system. To accomplish this the valve body 30 has a passage 81 which is connected with the outlet 62 and feed line 12 by the groove 48 of the valve member 34 when the valve stands in position to supply lubricant to the system through the feed line 10. The passage 81 is a branch of a longitudinally extending passage 83 which leads to the small chamber 85 in the valve body into which the vent pipe 87 is connected. This vent pipe may lead to a point at which it will discharge the returned lubricant onto a chain or guideway requiring lubrication, or it may be extended to discharge into the supply tank or reservoir of the system, so that in either case the small quantities of lubricant returned to the line 12 by actuation of the measuring valves will not block or hamper their operation. The same expedient is employed when the valve 34 is shifted to its other limit of travel in which the groove 48 connects the inlet passage 56 with the outlet 62 and feed line 12. In that case the small quantity of lubricant returned through the line 10 to the passage 60 flows through the groove 46 which connects the passage 60 with a passage 89 in the valve body leading into the small chamber 85 from which the vent pipe 87 extends to a region of low pressure.

Fig. 5 shows the same reversing valve 30, as arranged for use in connection with a so-called dual progressive system in which the lubricant supply is connected in a closed circuit with a series of measuring valves. The measuring valves are indicated at 82 with tubes 84 connecting them in a single series. A feed tube 90 extends from the outlet 60 of the valve body 30 and the feed tube 92 connects with the outlet 62 to complete the circuit. Each of the measuring valves 82 is shown with two delivery pipes 86 and 88 from which lubricant is delivered alternately by actuation of the valves 82. It may be understood that lubricant under pressure is supplied from a pump and reservoir coupled to the filter unit 52 at the coupling 54 and supplying lubricant to the inlet passage 56. When the valve member 34 is disposed at its middle position, as shown in Fig. 5, it cuts off the inlet 56 from both outlets 60 and 62; but, when shifted to the right by actuation of the lever 36, the valve member serves to connect the inlet 56 with the outlet passage 60 and feed line 90 so that lubricant is supplied progressively to the measuring valves 82 of the system and each valve delivers a charge of lubricant from its delivery tube 86 to the bearing or other part to which that tube leads.

For use with a dual progressive system the indicator 68, or a substantially similar indicator, is mounted in a threaded opening leading to the chamber 85 in the valve body, and the opening 96, which is occupied by the threaded stem of an indicator when the valve is used with the dual manifold system, is closed by means of a plug 98, as seen in Fig. 5. When the valve member 34 is disposed at its right-hand limit, the groove 48 will connect the passage 62 with the branch passage 81 leading into the longitudinally extending passage 83 which in turn connects with the chamber 85 into which the indicator 68 is fitted. Understanding that at the beginning of the lubricating cycle the indicator is not under pressure and its signal stem 80 is retracted into the cap 76, as shown in Fig. 5, it will be seen that as lubricant is supplied under pressure through the tube 90 and then progressively through the valves 82 and their connecting tubes 84, the pressure will be applied eventually to the tube 92 and the passage 62 so that lubricant traveling through the passage 62 into the passages 81 and 83 will fill the hollow stem 78 of the indicator and will force the signal stem 80 upwardly into its protruding position. This will notify the operator that all the measuring valves have been actuated.

He will then shift the valve 34 for reversing the flow but he will first hold the valve at its middle position, as illustrated in Fig. 5, so that the narrow groove or channel 50 in the valve member will register with and connect the branch passage 100 with the vent passage 102 from which the pipe 104 leads to a region of low pressure such as the tank or reservoir of the system. This relieves the pressure in the indicator 68 and permits its signal stem to be retracted within the cap 76.

The operator will then shift the valve 34 to its left-hand limit. In this position the groove 48 of the valve will connect the inlet 56 with outlet passage 62 and feed tube 92 from which the lubricant under pressure will progress through the measuring valves 82 and their connecting tubes 84 until it fills the tube 90 and reenters the valve body through the passage 60. With the valve 34 at its left-hand limit the groove 46 of the valve connects the passage 60 with a branch passage 89 leading into the chamber 85, and thence to the indicator 68, causing its signal stem 80 to be protruded as before for indicating that the second half of the cycle has been completed by actuation of all the measuring valves for delivery of lubricant by way of the tubes 88 in this half of the cycle. The operator will then shift the valve 34 to its middle position registering the land portion 64 of the valve with the inlet passage 56 so as to close that passage, and registering the groove 50 with the branch passage 100 so as to vent the indicator 68 through the passage 102 and return pipe 104 leading to a region of low pressure such as the tank or reservoir of the system. This permits the indicator stem 80 to be withdrawn into the cap 76 ready for service in the next lubricating cycle.

Thus it will be seen that I have provided a reversing valve of relatively simple construction which is readily adapted for use either with the dual manifold system or with the dual progressive system of centralized lubrication and which provides for the employment of a pressure responsive indicator with either system for advising the operator when to manipulate the valve. While the foregoing description assumes that the same indicator 68 might be employed for either system, it happens that in the commercial construction slight different indicators are used for the two systems and the threaded opening leading to the chamber 85, which is shown provided with the vent pipe 87 in Fig. 1, is made slightly larger than the threaded opening 96 which receives the indicator 68 when the valve is used in the dual manifold system. It will be evident that if desired the threaded stems of the indicators could be standardized so that said openings in the valve body could be alike.

While there is shown and described herein certain specific structure embodying this invention and illustrative thereof, it is to be understood that the invention is not limited thereto or thereby but includes all modifications, variations and equivalents which may come within the scope of the appended claims.

I claim:

1. A reversing valve for a lubricating system comprising a valve body having a bore, a spool type valve member slidable in said bore, a pair of outlet passages in the body intersecting the bore and spaced apart longitudinally thereof, an inlet passage in the body intersecting said bore midway between said outlets, the valve member having a pair of longitudinally spaced grooves which connect the inlet with said outlets alternatively when the valve member is shifted to one or the other limit of its travel, said member having a land between said grooves adapted to cut off the inlet from both outlets when the valve is positioned midway between said limits, and a pressure responsive indicator connected to said valve body, the body having a passage connected with the indicator and having two branches intersecting said bore at longitudinally separated points so spaced relative to the outlets that one branch is connected with one groove of the valve member and through it with one of the outlets when the valve member is disposed at one limit of its travel with its other groove connecting the inlet with the other outlet, and the other branch is connected with the other groove when the valve member is shifted to its opposite limit of travel with the said one groove of the valve member connecting the inlet to the first mentioned outlet.

2. A reversing valve for a lubricating system comprising a valve body having a bore, a spool type valve member slidable in said bore, a pair of line outlet passages in the body intersecting the bore and spaced apart longitudinally thereof, an inlet passage in the body intersecting said bore midway between said line outlets, the valve member having a pair of longitudinally spaced grooves which connect the inlet with said line outlets alternatively when the valve member is shifted to one or the other limit of its travel, said member having a land between said grooves adapted to cut off the inlet from both line outlets when the valve is positioned midway between said limits, and a pressure responsive indicator connected to said valve body, the body having a passage communicating with the indicator and including two branches intersecting said bore at longitudinally separated points so spaced that one branch is connected with one groove of the valve member and through it with one of the line outlets when the valve member is disposed at one limit of its travel, and the other branch is connected with the other groove of the valve member and thereby with the other line outlet when the valve is shifted to its other limit, said passage having a third branch, the valve member having a channel which registers with said branch when the valve member is adjusted midway between its limits of travel, and the body having a vent passage with which said channel connects said third branch.

3. A directional valve for a fluid distribution system comprising a valve casing having a valve chamber formed therein, an intermediate fluid inlet port in said chamber, fluid outlet ports on each side of said inlet port, a piston valve in said chamber having reduced parts for connecting said inlet port to one or the other of said outlet ports, means forming a bypass passageway communicating with said valve chamber at spaced points, said valve being adapted to connect said bypass with the said one of said outlets not connected to said inlet, and a vent port communicating with said chamber, said valve establishing communication between said bypass and vent port at an intermediate point in its movement.

4. A directional valve for a fluid distribution system comprising a valve casing having a valve chamber formed therein, an intermediate fluid inlet port in said chamber, a pair of fluid outlet ports, one on each side of said inlet port, a piston valve having a pair of reduced parts of sufficient length respectively to lap said inlet and one of said outlets for communicating said inlet with the outlets, said valve being movable between a first position in which the inlet is connected to an outlet through one of said reduced parts and a second position in which the inlet is connected to the other outlet through another reduced part, and bypass means including a pair of ports respectively on one side of each of said outlets and a passageway connecting said ports, said bypass ports being so spaced relative to the outlet that either reduced part of the valve member will lap one bypass port and an outlet while the other reduced part laps the inlet and the other outlet.

FREDERICK G. SCHWEISTHAL.

REFERENCES CITED

The following references are of record in the file of this patent:

UNITED STATES PATENTS

| Number | Name | Date |
| --- | --- | --- |
| 1,279,087 | Desmond | Sept. 17, 1918 |
| 1,292,013 | Munger | Jan. 21, 1919 |
| 1,338,922 | Hopwood | May 4, 1920 |
| 2,369,887 | Eckman | Feb. 20, 1945 |
| 2,440,411 | Leonard | Apr. 27, 1948 |